June 22, 1937. E. H. LAND 2,084,350
STEREOSCOPIC VIEWER
Filed Aug. 27, 1935
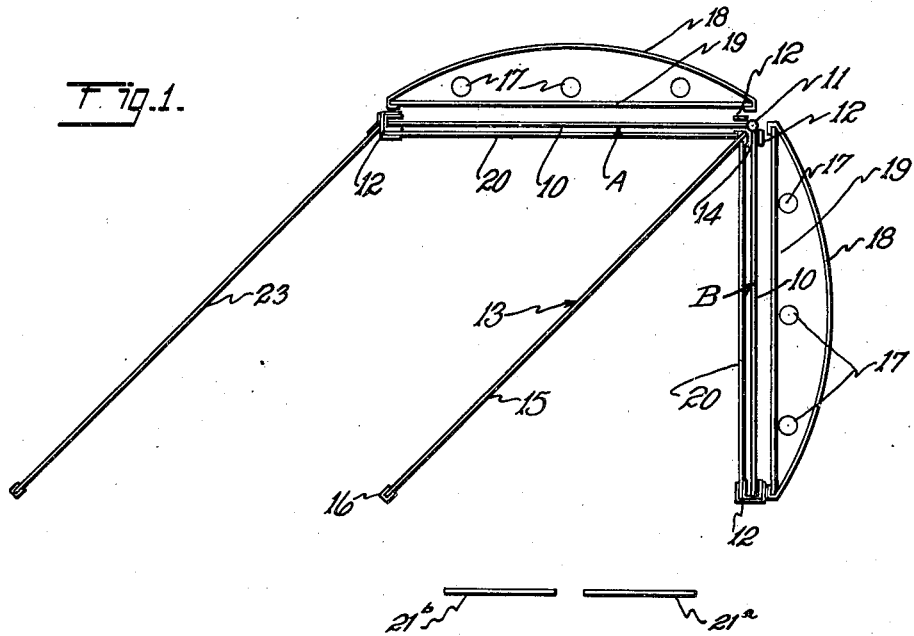
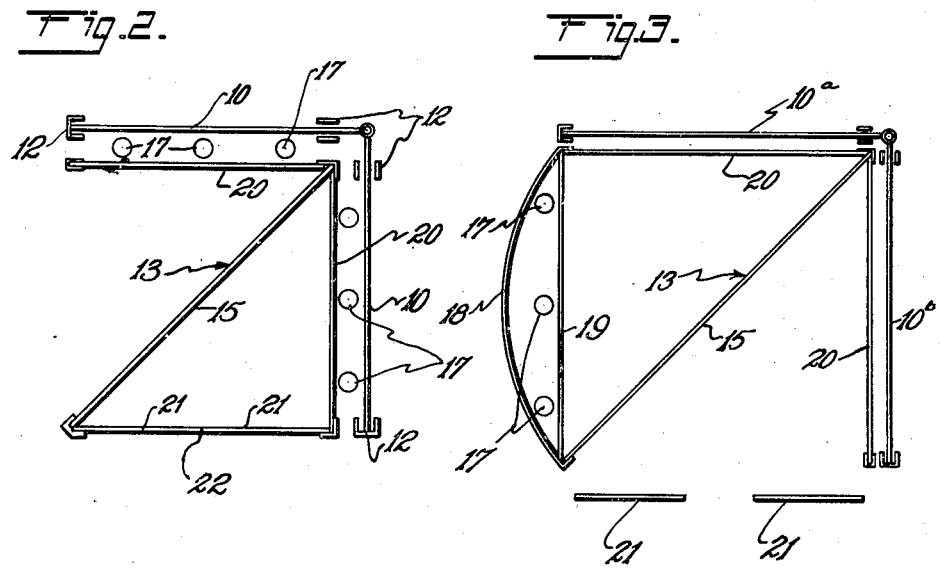
INVENTOR
Edwin H. Land
BY
Donald L. Brown
ATTORNEY Patented June 22, 1937

2,084,350

UNITED STATES PATENT OFFICE 2,084,350

STEREOSCOPIC VIEWER

Edwin H. Land, Wellesley Farms, Mass., assignor to Land-Wheelwright, Inc., Union City, N. J., a corporation of New Jersey Application August 27, 1935, Serial No. 38,085

1 Claim. (Cl. 88—29)

This invention relates to a new and improved method of viewing stereoscopic images or pictures, and to new and improved apparatus therefor.

An object of the invention is to provide a method wherein beams of light carrying stereoscopic images and having different directions of propagation are caused to merge and to assume the same direction of propagation.

A further object of the invention is to provide such a method wherein distinctive wave characteristics are imparted to the beams carrying each stereoscopic image before they are merged, and wherein said wave characteristics are retained after the merging of the beams, to the end that the portion of the merged beams carrying the left eye image may thereafter be separated from the portion of the merged beam carrying the right eye image.

A still further object of the invention is to provide such a method wherein polarized light is employed.

A still further object of the invention is to provide a method for viewing stereoscopic images wherein the convergence of observer's eyes is caused to correspond substantially to the accommodation normally associated with said convergence, and wherein a surface, partially reflecting and partially transmitting, is employed to cause a substantial merging of portions at least of beams of light carrying a plurality of stereoscopic images.

A still further object of the invention is to provide a device for accomplishing the aforesaid methods and which may be adapted to hold a plurality of stereoscopic pictures or prints in such a manner that the planes in which said pictures lie are caused to intersect, and to provide in said device a surface positioned within the angle formed by said intersecting planes and adapted partially to reflect light and partially to transmit light whereby beams carrying the said stereoscopic images may be caused at least in part to be substantially merged.

A still further object of the invention is to provide in such an apparatus means for imparting distinctive wave characteristics to the beams carrying each stereoscopic image, and further to provide viewing means adapted to permit one only of each of said images to reach each eye of an observer, even after the beams carrying said images have been merged.

A still further object of the invention is to provide such an apparatus which may be adapted for use with either so-called transparent, or with opaque stereoscopic prints or pictures.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapte to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing, in which:

Figure 1 is a diagrammatic representation of a device embodying one form of the invention and adapted to perform the process of the invention;

Figure 2 is a modification of the device shown in Fig. 1; and

Figure 3 is a still further modification of the device shown in Fig. 1.

With reference to Fig. 1, 10 represents a plurality of stereoscopic images or prints, or negatives, which, if desired, may be mounted in book form, hinged together as at 11. These prints or negatives are preferably so mounted that when they are positioned in the device they are mirror images of each other, (except for the stereoscopic difference between them) i. e., they are so mounted or positioned that if they are folded about the hinge 11 so as to be superimposed, corresponding portions of each of the prints or negatives will be substantially in registry.

The apparatus may be provided with suitable holding elements 12 adapted to hold and position the stereoscopic prints in such a way that the planes in which each of the prints lie will intersect, as for example at the hinge 11.

Within the angle formed by the intersecting planes of the stereoscopic prints, an element 13 is provided. This element may, if desired, be hinged as at 14 to the frame of the device. The element 13 may provide a surface, as for example the surface 15, which is partially light-reflecting and partially light-transmitting. This surface may be of any desired type to accomplish the desired result. It may for example be a lightly metalized surface such as a lightly silvered, aluminized or platinized surface such as is employed in the manufacture of transparent mirrors, or a heavily metalized mirror with minute interstitial openings in the metalized surface.

It is to be understood that in certain forms of the device this surface may preferably be so designed as to reflect half of the light and transmit half of the light, while in other forms of the device, the surface may reflect more or less than half the light impinging upon it. In any event, a preferred form of the invention is one wherein this surface is so constructed that the beams carrying the stereoscopic images, when merged after reflection from or refraction through this surface, are of adequately similar intensity.

The element 13 may be held in any suitable frame 16 in any desired position within the angle formed by the planes of the stereoscopic prints 10. A preferable position, however, is one wherein the element 13 bisects the angle formed by the stereoscopic prints. When so positioned the surface 15 functions in a manner hereinafter to be explained, substantially to superimpose the stereoscopic images carried by the beams impinging upon that surface irrespective of the position of the observer, so that an observer, when equipped with suitable viewing devices suffers no appreciable eyestrain or discomfort even though he change his position while viewing the images.

The device shown in Fig. 1 is intended primarily for use with transparent stereoscopic prints or negatives, and hence sources of illumination may be provided behind each stereoscopic print so that light emanating therefrom may pass through the print and then impinge upon the element 13. As shown these sources of illumination may comprise sources of electric light 17, reflectors 18, and light-diffusing elements 19, such for example as plates of ground glass. The sources of illumination should preferably be such as to cause an adequately diffused beam to traverse the stereoscopic prints or negatives. It is to be understood that in certain cases daylight may be employed.

The device is preferably also provided with means to impart to the beams carrying each stereoscopic image distinctive wave characteristics. As shown, these means may comprise sheets 20 so positioned as to intersect the beams of light emanating from the light sources 17 and impinging upon the surface 15 of the element 13. It will be understood that these filters 20 may be positioned anywhere between the light sources and the surface 15, provided, of course, that they are not so positioned as to obstruct rays carrying the other stereoscopic image, and provided also that the stereoscopic prints are not of a character to alter or destroy the distinctive wave characteristics imparted to the beams by the filters. Where the prints are not of a character to destroy the wave characteristics, the filters 20 may be positioned between the light source and the image.

While the filters 20 may be of a type to impart distinctive wave length characteristics to the beams carrying each stereoscopic image, it is preferred that the filters 20 be light-polarizing elements. Where linear polarization is employed these elements are preferably so positioned as to polarize the beams carrying the stereoscopic images in such a way that the plane of polarization of one of said beams is substantially at right angles to the plane of polarization of the other of said beams with the direction of vibration substantially either parallel to or at right angles to the plane of incidence and reflection of the surface 15. A suitable light-polarizing element for use with the apparatus and process of this invention may be the element described in the pending application of Land, Serial No. 434,833. The polarizer referred to comprises a set transparent suspending medium, as for example a suspending medium of cellulose acetate in which there are dispersed and embedded a mass of minute polarizing particles, as for example needle-shaped particles of herapathite of colloidal size, the polarizing axes of the particles being oriented within the medium to substantial parallelism, and the suspending medium acting to retain the particles therein in oriented position. Such a polarizer is thin. It may be obtained in sheet form. It has an unlimited angular aperture. It transmits the polarized component with substantially no color change, without lateral displacement, and with high efficiency.

Where it is desired to form the images reaching the observer in circularly polarized light, filters of the general type shown in the copending application of Land, Serial No. 714,239, may be employed. Such filters may comprise light polarizing elements of the type described above as disclosed in Land's pending application Serial No. 434,833, with which there may be associated, either as a separate element or as a sheet integral with the light polarizing element, a quarter wave plate adapted, in conjunction with the polarizing element, to effect circular polarization of the transmitted beam. Under such circumstances the reflecting surface 15 is employed as a portion of the means to impart circular polarization to the beam reflected therefrom.

The observer may be equipped with viewing glasses or visors of such character that the beams carrying one image reach one eye only of an observer and beams carrying the other image reach only the other eye. As shown in Fig. 1, these filters 21 may comprise either eye-glasses or other viewing means, or they may even be built into the apparatus in the form of a viewing panel, as shown for example in Fig. 2. In any event, that filter which is intended to be superimposed over the right eye of the observer, for example, should be so designed and positioned as to block the beams carrying the left-eye stereoscopic image and to pass the beams carrying the right-eye stereoscopic image, while the filter positioned before the left eye of the observer should function to pass the beams carrying the left-eye stereoscopic image and to block the beams carrying the right-eye stereoscopic image.

Where wave length filters are employed, the right-eye filter should transmit wave lengths corresponding with the wave lengths transmitted by the filter superimposed before the right-eye stereoscopic print, and the left-eye filter should transmit wave lengths corresponding with the wave lengths transmitted by the filter superimposed before the left-eye stereoscopic print. Where linear light-polarizing elements are employed, the polarizer positioned before the right eye of the observer should be positioned with its polarizing axis substantially parallel to the polarizing axis of the filter positioned before the right-eye stereoscopic print and with its polarizing axis substantially at right angles to the polarizing axis of the filter positioned before the left-eye stereoscopic print, while the viewing visor or filter positioned before the left eye of the observer should be so positioned that its polarizing axis is parallel to the polarizing axis of the filter positioned adjacent the left-eye stereoscopic image.

The operation of the device is as follows:

Let us assume that the right-eye stereoscopic print is the print shown at A in Fig. 1. The beam traversing the right-eye stereoscopic image traverses the adjacent light filter 20 and acquires the distinctive wave characteristics imparted to it by that filter. If that filter be a linear light polarizer, the beam, upon traversing the filter, becomes plane-polarized. The polarized beam then strikes the element 13 and the back of the "half-silvered" surface 15. A portion of the beam is reflected from the surface of the element 13 and from the back of the silvered surface 15. The remainder of the beam traverses the element 13 and the surface 15. The direction of propagation of that portion of this beam which traverses the element 13, remains substantially the same from the light source to the eyes of the observer.

The beam originating with the light source associated with the left-eye image B traverses the left-eye stereoscopic image and the filter-associated therewith and acquires the wave characteristics imparted to it by that filter, which, if it be a linear light-polarizing element, plane-polarizes the beam preferably so that its plane of polarization is at right angles to the plane of polarization of the beam carrying the right-eye image. The beam carrying the left-eye image then impinges upon the half-silvered surface 15 of the element 13, a portion of the beam traverses the surface and the element 13 and the remainder of the beam is reflected from the surface 15. Its direction of propagation is changed, and if the element 13 bisects the angle formed by the stereoscopic prints 10, the beam carrying the left-eye image or that portion of it which is reflected from the surface 15 is merged with that portion of the beam carrying the right-eye image which traverses that surface, and both the reflected and refracted beams are caused to assume the same direction of propagation, i. e., toward the viewing visors 21.

The merged beams then impinge upon the viewing visors 21. That visor which is adjacent the right eye of the observer, i. e., visor 21a, is preferably positioned, if it be a linear light-polarizing element, with its plane of polarization parallel with the plane of polarization of the filter adjacent the right-eye stereoscopic image or print A. The viewing filter or visor 21a therefore acts to pass that portion of the merged beams carrying the right-eye stereoscopic image and to block that portion of the merged beams carrying the left-eye stereoscopic image. Similarly the viewing visor or filter 21b adjacent the left eye of the observer acts to block that portion of the merged beams carrying the right-eye stereoscopic image and to pass that portion of the merged beams carrying the left-eye stereoscopic image.

In Fig. 2 a modification of the device shown in Fig. 1 is illustrated. In this embodiment of the invention the stereoscopic prints 10 may be considered as opaque. The light sources 17 are positioned between the prints 10 and the element 13, so that light emanating from the light source is reflected from the surfaces of the prints, which are thus illuminated. In this embodiment of the invention the same numerals are employed to designate the same or equivalent elements as those employed in Fig. 1. In the embodiment of the invention shown in Fig. 2 the viewing visors or filters 21 are shown as built into the stereoscopic viewing device. In using such a device the observer would take a position so that the line 22 separating the viewing visors 21 would be positioned at some point between the eyes of the observer, who would thus look simultaneously through each of the viewing visors 21.

In Fig. 3 a further modification of the invention is shown. Here as in Fig. 2, it is intended that the stereoscopic prints employed may be opaque. In this modification of the invention a source of illumination comprising the light bulbs 17, the reflector 18, and the diffusing screen 19 may be positioned at one side of the stereoscopic viewing device so as to cast a beam of light upon the back or unsilvered face of the element 13. A portion of this beam traverses the element and the semi-silvered surface 15 and illuminates the left-eye image 10b. Another portion of the beam is reflected from the back of the semi-silvered surface 15 and illuminates the right-eye image 10a of the stereoscopic prints. In a device of this character the filters 20 should preferably be so inclined that surface glare therefrom is not apparent.

Other means for illuminating the prints whether they be opaque or transparent, will be obvious, and all are deemed to fall within the scope of this invention.

It will be obvious that the stereoscopic viewing device which has been described may be built in such a manner as to collapse into a relatively small space, so that it may be easily transported and erected.

A mirror element 23, for example, may be employed to utilize that portion of each beam carrying a stereoscopic image which does not assume a direction of propagation after contact with the element 13 toward the viewing visors 21. For example, in Fig. 1, a portion of the beam carrying the left-eye stereoscopic image B has been described as being reflected from the semi-silvered surface 15 in the direction of the elements 21. The other portion of this beam traverses the semi-silvered surface 15 and the element 13, and would impinge upon the mirror element 23, which is preferably so positioned as to reflect the portion of the beam falling upon it so that an observer standing beside the observer wearing the filters 21 might see the beam. So also that portion of the beam carrying the right-eye stereoscopic image A which is reflected from the element 13 would, in the device shown in Fig. 1, be directed so as to impinge upon the mirror element 23 from which it would again be reflected to an observer positioned beside the observer wearing the viewing visors 21. It is obvious that without the element 23 an observer might also take up such a position as would enable him to view those portions of the beams otherwise reflected from the element 23.

It is to be understood that the observer need not be positioned close to or directly before the stereoscopic viewing device. A plurality of observers, each equipped with suitable viewing visors, may simultaneously view the stereoscopic images. It is to be understood, furthermore, that the device may be built of any desired size, to accommodate any desired size of stereoscopic print.

When an object viewed is close to an observer the eyes of the observer converge more acutely than when the object viewed is at a distance. So also each eye of the observer focuses upon the object, i. e., accommodates for that distance. There is apparently an association through physiological reflexes linking the accommodation for a given distance to the convergence for that distance.

In the apparatus which has been described as embodying this invention, it is possible to so adjust the position of each stereoscopic image in the frame 12 that when these images are merged in the beams reflected and transmitted through the surface 15, and when the images are brought to the eyes of the observer, the convergence of the observer's eyes may be caused to correspond to the accommodation normal for the distance of the stereoscopic prints from the eyes. Furthermore, with the element 13 positioned as shown in the drawing to bisect the angle formed by the stereoscopic images, this effect of corresponding convergence and accommodation is maintained even though the observer shifts his position with respect to the viewing aperture of the stereoscopic viewing device. As the observer moves from side to side, for example, the images retain their relative superimposed positions, and one does not appear to slide across the other.

Whatever adjustment may be necessary to control the degree of divergence necessary in the viewing of any particular pair of stereoscopic prints may be accomplished by a slight variation in the mounting or positioning of the prints within the viewing device.

Where the filters 20 are light polarizing elements the device may be employed with stereoscopic prints or pictures in full color.

Since certain changes in carrying out the above process and in the construction set forth which embody the invention may be made without departing from its scope, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent, is:

A stereoscopic viewer comprising in combination means to position a pair of stereoscopic pictures, a transparent mirror, positioned to cause said pictures to appear approximately superimposed, sheets of light-polarizing material positioned to polarize differently the rays from each of said pictures without altering appreciably the color characteristics thereof and a plurality of sheets of light polarizing material placed between the eyes of an observer and said transparent mirror and adapted to permit one eye to see one only of said pictures and the other eye only the other of said pictures.

EDWIN H. LAND.